(12) United States Patent
Chen et al.

(10) Patent No.: US 11,250,232 B2
(45) Date of Patent: Feb. 15, 2022

(54) FINGERPRINT DETECTING SYSTEM AND RELATED METHOD

(71) Applicant: NOVATEK Microelectronics Corp., Hsin-Chu (TW)

(72) Inventors: Hung-Kai Chen, Taipei (TW); Ting-Hsuan Hung, Hsinchu (TW); Chih-Yuan Chang, Hsinchu County (TW); Feng-Lin Chan, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/789,448

(22) Filed: Feb. 13, 2020

(65) Prior Publication Data

US 2021/0256240 A1    Aug. 19, 2021

(51) Int. Cl.
*G06K 9/00* (2006.01)
(52) U.S. Cl.
CPC ..... *G06K 9/00013* (2013.01); *G06K 9/00067* (2013.01)

(58) Field of Classification Search
None
See application file for complete search history.

(56) References Cited

U.S. PATENT DOCUMENTS

| | | | | |
|---|---|---|---|---|
| 2017/0147860 A1* | 5/2017 | Yang | ........................ | G06K 9/40 |
| 2017/0177934 A1* | 6/2017 | Ran | ..................... | G06K 9/00013 |
| 2017/0337413 A1* | 11/2017 | Bhat | ................... | G06K 9/00087 |
| 2018/0129798 A1* | 5/2018 | He | .......................... | G06F 3/042 |

* cited by examiner

*Primary Examiner* — Nicholas J Lee
(74) *Attorney, Agent, or Firm* — Winston Hsu

(57) ABSTRACT

A fingerprint detecting system comprises a fingerprint module, for receiving a fingerprint driving signal and performing a frequency modulation on the fingerprint driving signal, to correspondingly outputting a fingerprint signal with a first frequency based on the fingerprint driving signal, and a signal processing circuit, coupled to the fingerprint module, for receiving the fingerprint signal with the first frequency, performing a frequency demodulation to shift the first frequency of the fingerprint signal to a second frequency, and filtering the fingerprint signal with the second frequency based on the first frequency, whereby the filtered fingerprint signal is used for a fingerprint data analysis.

9 Claims, 3 Drawing Sheets

FINGERPRINT DETECTING SYSTEM AND RELATED METHOD

BACKGROUND OF THE INVENTION

1. Field of the Invention

The present invention relates to a fingerprint detecting system, and more particularly, to a fingerprint detecting system with frequency modulation for noise removal.

2. Description of the Prior Art

With advancements in technology, mobile devices such as smart phones, tablets, laptops, GPS navigation systems and electronic books have become indispensable in our daily life. Compared with mobile devices that only have communication functions, modern mobile devices combine various functions such as communication, networking, photographing, games and data processing. This type of multifunctional design is more attractive to consumers. Fingerprint recognition is a popular function for security and privacy. For example, a mobile phone may have a fingerprint module built into a home button or in a dedicated region (e.g. a sensor pad) to detect user fingerprint.

In recent years, the optical fingerprint detection has become one of the most popular fingerprint detection schemes. Please refer to FIG. 1, which is a schematic diagram of the structure of the fingerprint detecting system 10. The fingerprint detecting system 10 includes a fingerprint module and a readout integrated circuit ROIC. In addition, the fingerprint module includes a sensor pad configured to contact a finger of a user and sense the light reflected by the finger. For detailed fingerprint detecting operation, the fingerprint module receives a fingerprint driving signal "Write" to enable the detecting function of the fingerprint module, and then generates the fingerprint signal including fingerprint information (i.e. regarded to the light reflected by the finger) according to the "Write" signal and the sensed signal. The fingerprint signal is then forwarded to the readout integrated circuit ROIC to perform signal processing (e.g. noise removal and analog to digital converting) for fingerprint data analysis. Note that, the fingerprint driving signal inputted into the fingerprint module is usually a DC signal, namely a baseband signal, so that the fingerprint signal outputted from the fingerprint module is also a DC signal, which is interfered by low-frequency noise (e.g. flicker noise and thermal noise in the fingerprint module). As a result, after the readout integrated circuit ROIC receives the fingerprint signal from the fingerprint module, the readout integrated circuit ROIC is difficult to eliminate these noises from the fingerprint signal since the fingerprint signal and these noises are both in a low-frequency range.

Besides, the fingerprint detecting system 10 is susceptible to interference from other modules of the mobile device. For example, if the fingerprint detecting system 10 is integrated with a display module such as an organic light-emitting diode (OLED) panel, the panel structure of the display module may affect the fingerprint signal of the fingerprint module, e.g., parts of the light reflected from the display module. In other words, the fingerprint detecting operation coexisting with the touch sensing operation and/or display operation generates non-ignorable interferences on the fingerprint signal, which significantly increases difficulty of fingerprint recognition.

SUMMARY OF THE INVENTION

It is therefore an objective to provide a fingerprint detecting system to solve the above problem.

An embodiment of the present invention discloses a fingerprint detecting system. The fingerprint detecting system comprises a fingerprint module, for receiving a fingerprint driving signal and performing a frequency modulation on the fingerprint driving signal, to correspondingly outputting a fingerprint signal with a first frequency based on the fingerprint driving signal, and a signal processing circuit, coupled to the fingerprint module, for receiving the fingerprint signal with the first frequency, performing a frequency demodulation to shift the first frequency of the fingerprint signal to a second frequency, and filtering the fingerprint signal with the second frequency based on the first frequency, whereby the filtered fingerprint signal is used for a fingerprint data analysis.

Another embodiment of the present invention discloses a fingerprint detecting system. The fingerprint detecting system comprises a frequency modulation circuit, for receiving a fingerprint driving signal and performing a frequency modulation on the fingerprint driving signal, to output a fingerprint driving signal with a first frequency, a fingerprint module for receiving the fingerprint driving signal with the first frequency, and correspondingly outputting a fingerprint signal with the first frequency based on the received fingerprint driving signal, and a signal processing circuit, coupled to the fingerprint module, for receiving the fingerprint signal with the first frequency, performing a frequency demodulation to shift the first frequency of the fingerprint signal to a second frequency, and filtering the fingerprint signal with the second frequency based on the first frequency, whereby the filtered fingerprint signal is used for a fingerprint data analysis.

Another embodiment of the present invention discloses a method of fingerprint detection for a fingerprint detecting system. The method comprises receiving a fingerprint driving signal, performing a frequency modulation on the fingerprint driving signal, to output the fingerprint driving signal with a first frequency, generating a fingerprint signal with the first frequency based the fingerprint driving signal with the first frequency, performing a frequency demodulation on the fingerprint signal with the first frequency, to shift the first frequency of the fingerprint signal to a second frequency, filtering the fingerprint signal with the second frequency based on the first frequency, and converting the fingerprint signal with the second frequency from an analog signal to a digital signal for a fingerprint data analysis.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
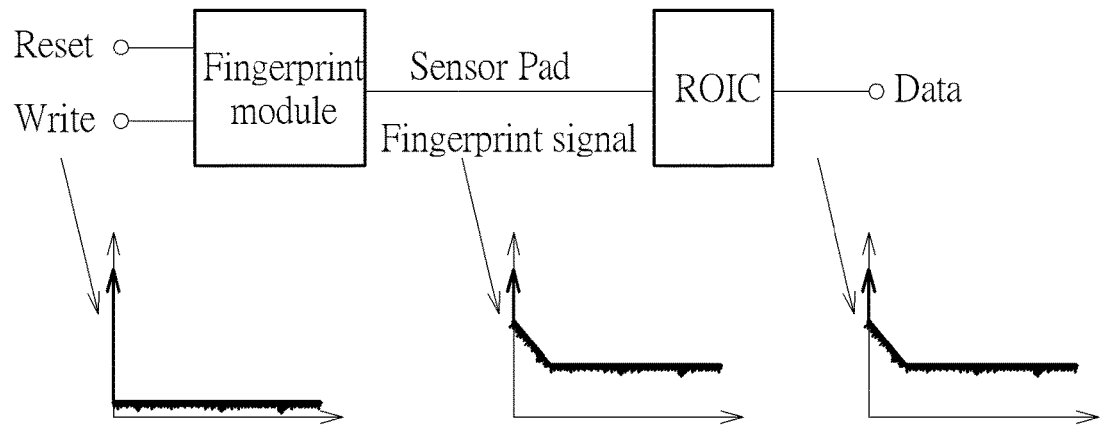
FIG. 1 is a schematic diagram of a fingerprint detecting system according to the prior art.
Figure 2:
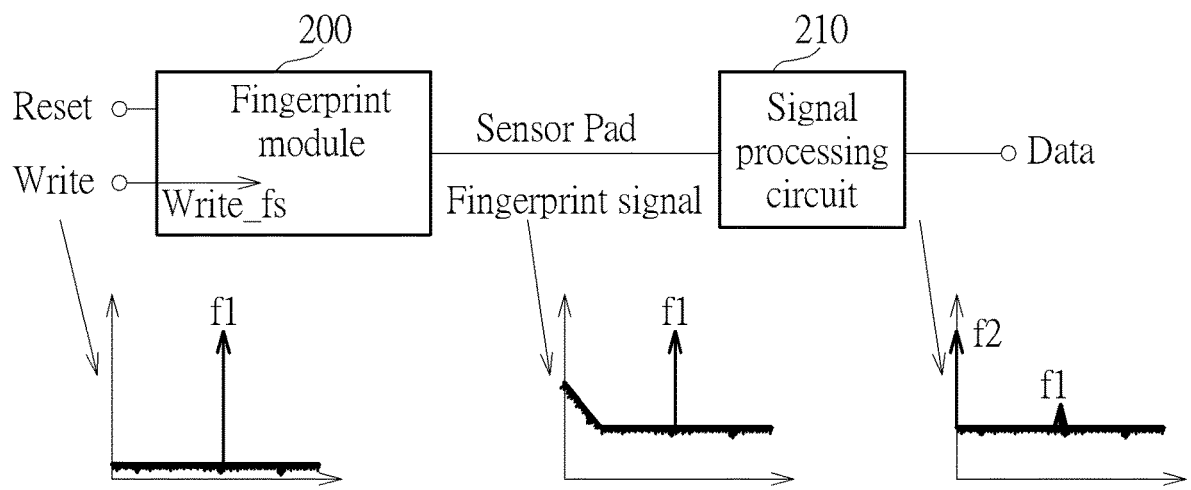
FIG. 2 is a schematic diagram of a fingerprint detecting system according to an embodiment.

Please refer to FIG. 2, which is a schematic diagram of a fingerprint detecting system 20. The fingerprint detecting system 20 includes a fingerprint module 200 and a signal processing circuit 210 coupled to the fingerprint module 200. The fingerprint module 200 receives fingerprint driving signal "Write" for enabling the fingerprint detection function, and then performs the frequency modulation on the fingerprint driving signal, to shift the fingerprint driving signal from a baseband frequency to a first frequency f1 (e.g. a frequency higher than the baseband frequency), so as to avoid the interference in the baseband range. In addition, the fingerprint module 200 includes a sensor pad 202 to detect light reflected from the fingerprint of the user, and therefore generates the fingerprint signal with the first frequency f1 according to the received "Write" signal and the detected signal of the sensor pad 202. The signal processing circuit 210 receives the fingerprint signal with the first frequency f1 from the sensor pad 202 of the fingerprint module 200, and performs the frequency demodulation to shift the first frequency f1 of the fingerprint signal to a second frequency f2 (i.e. the baseband frequency). In addition, the signal processing circuit 210 filters the fingerprint signal with the second frequency f2 based on the first frequency f1, so as to remove the unwanted noise in the first frequency f1.

In a word, "Write" signal inputted to the fingerprint module 200 is modulated to the first frequency f1, which could be any frequency higher than an original frequency of the "Write" signal, so that the fingerprint signal outputted from the fingerprint module 200 is avoided of low-frequency interference (e.g. noise resulted from the fingerprint module 200 or other co-existed modules). On the other hand, the signal processing circuit 210 demodulates the fingerprint signal with the first frequency f1 to the baseband frequency, and then filters the noise higher than the baseband frequency, to remove high-frequency interference.

Note that, the abovementioned interference in this article may be any noise, which may include flick noise, thermal noise of the fingerprint module 200, and any other modules (e.g. display panel and touch panel) within the electronic device (e.g. mobile phone), but it is not limited herein.

Figure 3:
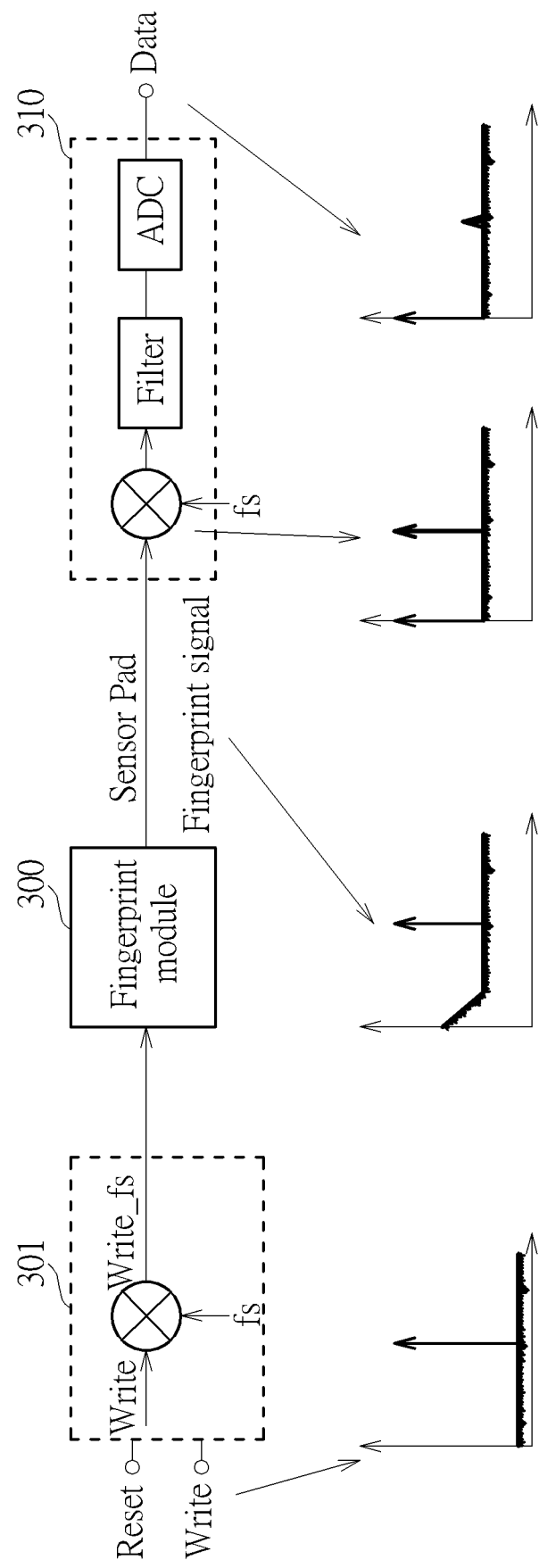
FIG. 3 is a schematic diagram of a fingerprint detecting system according to an embodiment.

The present invention aims at providing the signal processing method for the fingerprint detecting system 20. Those skilled in the art may make modifications and alternations accordingly. For example, the fingerprint module 200 as shown in FIG. 2 may include a mixer (not shown in FIG. 2) to mix the "Write" signal, which may be a DC signal, and a signal with the frequency fs, so as to generate the fingerprint driving signal "Write_fs" signal for the fingerprint module 200 to output the fingerprint signal with the frequency fs. In other embodiments, the fingerprint detecting system 30 as shown in FIG. 3 includes the frequency modulation circuit 301, which is not integrated in the fingerprint module 300, for generating the "Write_fs" signal for the fingerprint module 300. On the other hand, the signal processing circuit 310 includes the mixer, the filter, and the analog to digital converter (ADC). The mixer mixes the received fingerprint signal with the frequency fs and the signal with the frequency fs, so that the frequency of the fingerprint signal is moved from the frequency fs to the baseband frequency, and the noise in the baseband frequency range is moved to the frequency fs. Thus, the filter could remove the noise according to the frequency fs (i.e. any interference higher than the frequency fs will be removed), and then outputs the fingerprint signal with the baseband frequency to the ADC, whereby the ADC converts the fingerprint signal without interference from an analog signal to a digital signal for fingerprint data analysis.

Figure 4:
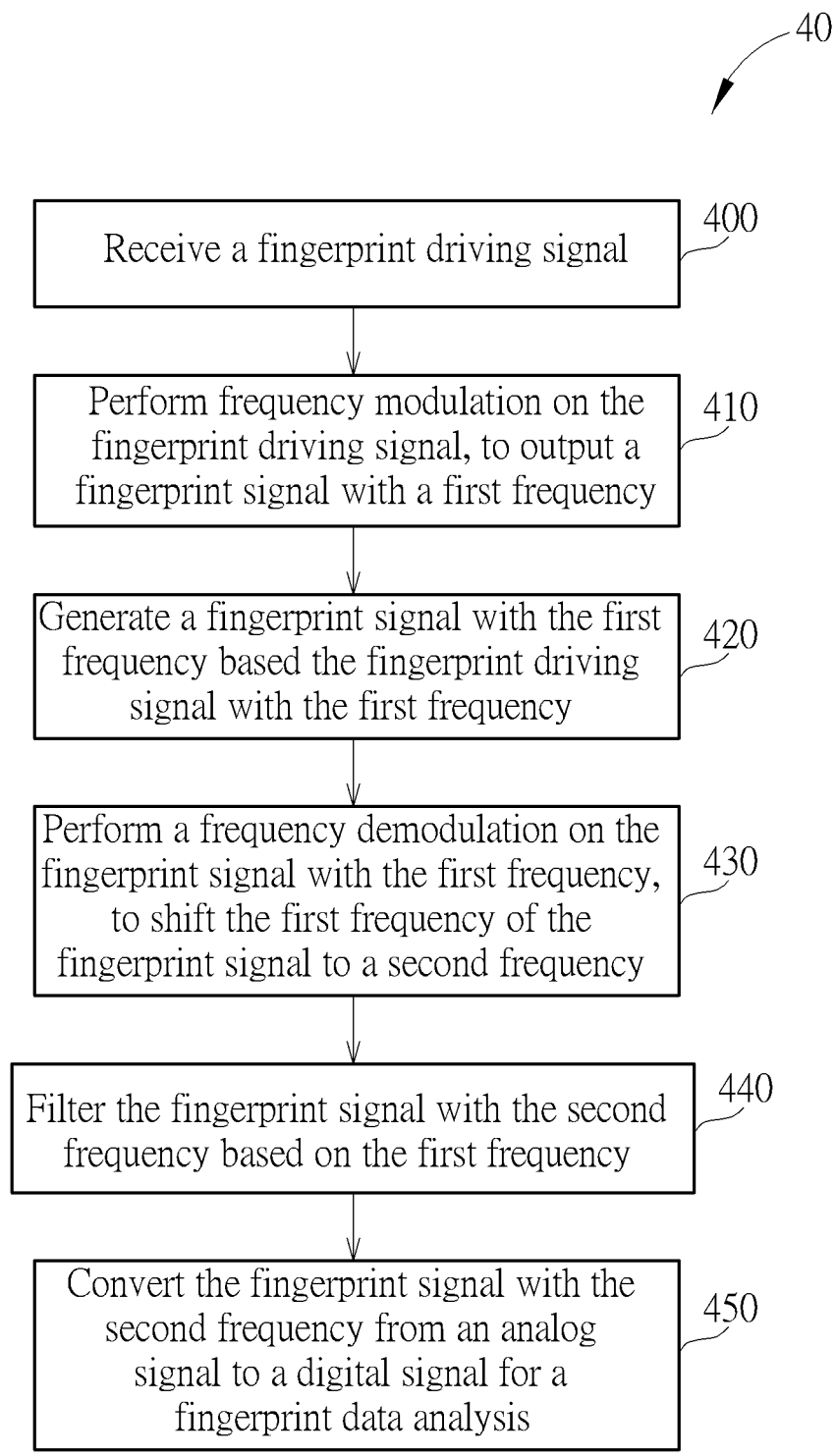
FIG. 4 is a schematic diagram of an operation of a fingerprint detecting system according to an embodiment.

The abovementioned operation for the fingerprint detecting system may be summarized into a signal processing process 40, as shown in FIG. 4. The signal processing process 40, which may be implemented in the fingerprint detecting system of FIGS. 2-3, includes the following steps:

Step 400: Receive a fingerprint driving signal.

Step 410: Perform frequency modulation on the fingerprint driving signal, to output a fingerprint signal with a first frequency.

Step 420: Generate a fingerprint signal with the first frequency based the fingerprint driving signal with the first frequency.

Step 430: Perform a frequency demodulation on the fingerprint signal with the first frequency, to shift the first frequency of the fingerprint signal to a second frequency.

Step 440: Filter the fingerprint signal with the second frequency based on the first frequency.

Step 450: Convert the fingerprint signal with the second frequency from an analog signal to a digital signal for a fingerprint data analysis.

According to the signal processing process 40, the low-frequency noise of the fingerprint signal could be avoided, and the high-frequency noise of the fingerprint signal could be removed, so as to obtain the fingerprint signal in the required frequency without interference for fingerprint data analysis. The detailed operations of the fingerprint detecting system are illustrated in the above paragraphs, so it is omitted herein.

In conclusion, the present invention addresses to noise removal for the fingerprint detecting system, to increase the reliability of the fingerprint recognition. In detail, the fingerprint driving signal inputted to the fingerprint module is modulated to a high frequency to avoid low-frequency noise, and the fingerprint signal outputted from the fingerprint module is demodulated by the signal processing circuit to eliminate the high-frequency noise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint detecting system comprising:
   a fingerprint module, for receiving a fingerprint driving signal and performing a frequency modulation on the fingerprint driving signal, to correspondingly output a fingerprint signal with a first frequency based on the fingerprint driving signal, wherein the fingerprint driving signal is a direct current signal, and the fingerprint module comprises a mixer for mixing the fingerprint driving signal and a signal with the first frequency, to generate the fingerprint signal with the first frequency; and
   a signal processing circuit, coupled to the fingerprint module, for receiving the fingerprint signal with the first frequency, performing a frequency demodulation to shift the first frequency of the fingerprint signal to a second frequency, and filtering the fingerprint signal with the second frequency based on the first frequency, whereby the filtered fingerprint signal is used for a fingerprint data analysis.

2. The fingerprint detecting system of claim 1, wherein the signal processing circuit comprises a mixer, a filter and an analog to digital converter, ADC, the mixer is used for shifting the received fingerprint signal from the first frequency to the second frequency, and outputting the fingerprint signal with the second frequency to the filter to remove unwanted noise of the fingerprint signal according to the first frequency, and then output to the ADC to convert the fingerprint signal with the second frequency from an analog signal to a digital signal for the fingerprint data analysis.

3. The fingerprint detecting system of claim 1, wherein the first frequency is any frequency higher than a frequency of the fingerprint driving signal.

4. The fingerprint detecting system of claim 1, wherein fingerprint module generates the fingerprint signal according to the fingerprint driving signal with the first frequency and a finger touch of a user detected via an optical sensing method.

5. A fingerprint detecting system comprising
a frequency modulation circuit, for receiving a fingerprint driving signal and performing a frequency modulation on the fingerprint driving signal, to output a fingerprint driving signal with a first frequency, wherein the fingerprint driving signal is a direct current signal, and the frequency modulation circuit comprises a mixer for mixing the fingerprint driving signal and a signal with the first frequency, to generate the fingerprint driving signal with the first frequency;
a fingerprint module for receiving the fingerprint driving signal with the first frequency, and correspondingly outputting a fingerprint signal with the first frequency based on the received fingerprint driving signal; and
a signal processing circuit, coupled to the fingerprint module, for receiving the fingerprint signal with the first frequency, performing a frequency demodulation to shift the first frequency of the fingerprint signal to a second frequency, and filtering the fingerprint signal with the second frequency based on the first frequency, whereby the filtered fingerprint signal is used for a fingerprint data analysis.

6. The fingerprint detecting system of claim 5, wherein the signal processing circuit comprises a mixer, a filter and an analog to digital converter, ADC, the mixer is used for shifting the received fingerprint signal from the first frequency to the second frequency, and outputting the fingerprint signal with the second frequency to the filter to remove unwanted noise of the fingerprint signal according to the first frequency, and then output to the ADC to convert the fingerprint signal with the second frequency from an analog signal to a digital signal for a fingerprint data analysis.

7. The fingerprint detecting system of claim 5, wherein the first frequency is any frequency higher than a frequency of the fingerprint driving signal received by the frequency modulation circuit.

8. The fingerprint detecting system of claim 5, wherein fingerprint module generates the fingerprint signal according to the fingerprint driving signal with the first frequency and a finger touch of a user detected via an optical sensing method.

9. A method of fingerprint detection for a fingerprint detecting system, the method comprising:
receiving a fingerprint driving signal;
performing a frequency modulation on the fingerprint driving signal, to output the fingerprint driving signal with a first frequency, wherein the fingerprint driving signal is a direct current signal, and a mixer is configured for mixing the fingerprint driving signal and a signal with the first frequency, to generate the fingerprint driving signal with the first frequency;
generating a fingerprint signal with the first frequency based the fingerprint driving signal with the first frequency;
performing a frequency demodulation on the fingerprint signal with the first frequency, to shift the first frequency of the fingerprint signal to a second frequency;
filtering the fingerprint signal with the second frequency based on the first frequency; and
converting the fingerprint signal with the second frequency from an analog signal to a digital signal for a fingerprint data analysis.

* * * * *